United States Patent
Yoon et al.

(10) Patent No.: US 7,292,877 B2
(45) Date of Patent: Nov. 6, 2007

(54) APPARATUS AND METHOD FOR CALIBRATING AND COMPENSATING FOR DISTORTION OF AN OUTPUT SIGNAL IN A SMART ANTENNA

(75) Inventors: Soon-Young Yoon, Seoul (KR); Su-Woong Youn, Suwon-shi (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 407 days.

(21) Appl. No.: 10/419,977

(22) Filed: Apr. 22, 2003

(65) Prior Publication Data

US 2004/0214604 A1  Oct. 28, 2004

Related U.S. Application Data

(63) Continuation of application No. PCT/CA03/00570, filed on Apr. 22, 2003.

(30) Foreign Application Priority Data

Apr. 19, 2002 (KR) ..................... 10-2002-0021648

(51) Int. Cl.
*H04M 1/00* (2006.01)
(52) U.S. Cl. ................ 455/562.1; 455/561; 455/67.11; 455/115.1
(58) Field of Classification Search ............. 455/456.1, 455/456.2, 456.3, 456.4, 456.5, 67.11, 67.13, 455/67.14, 67.16, 69, 456.6, 457; 342/423, 342/428, 430, 434, 437, 443, 444, 445, 446
See application file for complete search history.

(56) References Cited

U.S. PATENT DOCUMENTS 6,249,680 B1 * 6/2001 Wax et al. ............... 455/456.2
6,466,561 B1 * 10/2002 Lee et al. ................ 370/335
6,501,747 B1 * 12/2002 Friedlander et al. ........ 370/342
2002/0009062 A1 * 1/2002 Proctor et al. ............. 370/335

FOREIGN PATENT DOCUMENTS

EP 1178562 2/2002
GB 2342505 4/2000

* cited by examiner

*Primary Examiner*—Duc M. Nguyen
*Assistant Examiner*—Justin Lee
(74) *Attorney, Agent, or Firm*—Roylance, Abrams, Berdo & Goodman, L.L.P.

(57) ABSTRACT

Disclosed is an apparatus and method for calibrating and compensating for distortion of an output signal to an antenna in a mobile communication system with a smart antenna array. A calibration signal generator generates an extended Walsh code by extending a Walsh code used in the mobile communication system, and generates a calibration signal in synchronism with a Walsh code synchronization signal of the mobile communication system. A mobile communication signal generator generates a traffic signal for forming a beam pattern to a position of a mobile terminal in communication. A multiplier multiplies an error compensation value by an output signal of the mobile communication signal generator. An adder adds an output of the multiplier to an output signal of the calibration signal generator. An RF block for up-converting an output signal of the adder into an RF band signal, provides the up-converted RF band signal to the antenna array, extracts part of the signal provided to the antenna array, and feeds back the extracted signal component. An error calibration and compensation value calculator calibrates an error of the antenna array from the feedback signal, calculates a compensation value for compensating for the error, and provides the compensation value to the multiplier.

9 Claims, 5 Drawing Sheets

APPARATUS AND METHOD FOR CALIBRATING AND COMPENSATING FOR DISTORTION OF AN OUTPUT SIGNAL IN A SMART ANTENNA

PRIORITY

This application is a continuation under 35 U.S.C. § 120 of International Application No. PCT/CA03/00570, filed on Apr. 22, 2003 in English and designating the United States, which claims priority under 35 U.S.C. § 119 to an application entitled "Apparatus and Method for Calibrating and Compensating for Distortion of Output Signal in a Smart Antenna" filed in the Korean Intellectual Property Office on Apr. 19, 2002 and assigned Ser. No. 2002-21648, the contents of which are incorporated herein by reference.

BACKGROUND OF THE INVENTION

1. Field of the Invention

The present invention relates generally to an apparatus and method for controlling a smart antenna in a mobile communication system, and in particular, to an apparatus and method for controlling signals provided to a smart antenna installed in a base station transceiver subsystem (hereinafter referred to as "BTS") in a mobile communication system.

2. Description of the Related Art

In general, a code division multiple access (CDMA) mobile communication system distinguishes users through orthogonal codes, and performs communication between users and BTSs through mobile terminals and radio channels. In the BTS of the mobile communication system, a smart antenna is introduced to perform smooth communication with users over radio channels. A smart antenna technology has been developed to separately apply space vector weights to signals applied to each antenna element thereby forming a beam in a specific direction (beam forming), for signal transmission. In the CDMA mobile communication system, interference to neighboring terminals is reduced by transmitting data over forward channels using a smart antenna. This contributes to an increase in the power efficiency of a BTS.

A description will now be made of a CDMA mobile communication system with a smart antenna. When a user is located in the direction of +30° in front of a BTS and the number of antenna elements is 4, a beam pattern must be provided as illustrated in FIG. 1 in the ideal case. That is, a beam pattern of a signal must be generated in the direction of +30° in front of the BTS, so that a user terminal can correctly receive and restore the signal.

However, in the CDMA mobile communication system, when forward and reverse channels are established using a smart antenna, transmission signals may suffer phase change due to an error generated during initial installation of a base station system (BSS) or inaccuracy of a radio frequency (RF) device in operation and of hardware in the system. The phase change of transmission signals will be described herein below. Transmission signals may suffer phase variation due to performance variation during initial installation of a mobile communication system or due to heat or aging of equipment caused by continuous use of an RF device and hardware in the system. That is, although a beam pattern illustrated in FIG. 1 must be provided to transmit a good signal to a user terminal, a phase error illustrated in FIG. 2 by a sold line may occur due to the above-stated reasons. In FIG. 2, a curve 'a' shown by a dotted line indicates a beam pattern that must be actually transmitted, while a curve 'b' shown by a solid line indicates a beam pattern with a phase error.

When the actual transmission beam pattern is out of phase (or phase-distorted), if a BTS transmits a signal at normal transmission power, a user terminal has difficulty in correctly receiving the signal. Therefore, the BTS must transmit data at a higher power level, and this acts as a load to the system, causing a reduction of power that can be allocated to other terminals. In addition, the signal transmitted at higher power interferes with other terminals, causing a reduction in call quality.

Therefore, when a smart antenna is used, the phase variation must be compensated for. Reference will now be made to FIG. 3. In FIG. 3, a curve 'a' shown by a dotted line indicates an ideal beam pattern with a desired angle of 30°, a curve 'b' shown by a thin solid line indicates a beam pattern actually output from a BTS, and a curve 'c' shown by a bold solid line indicates a beam pattern provided for compensation. It is possible to pre-estimate an out-of-phase value (or phase distortion value) by calibrating a phase of the curve 'b' for an actually transmitted beam pattern and using a difference between the calibrated phase and a phase of the curve 'a' for the beam pattern that must be actually transmitted. As the phase distortion value can be pre-estimated, the BTS can pre-distort a phase by a predetermined value depending on the estimated phase distortion value, thereby transmitting a signal in accordance with the curve 'c'. There is a method of transmitting a beam pattern of an actual transmission signal in accordance with the curve 'a' through the above-stated process.

In this method, phase distortion must be calibrated and compensated for in order to compensate for phase variation. There are four typical methods for calibrating phase distortion: (1) a pseudo-random noise (PN) code spreading method, (2) a Walsh code spreading method, (3) a method of using an orthogonal code and discrete Fourier transform (DFT) in a transmission path, and (4) a traffic signal feedback method.

A conventional process of calibrating a phase of a transmission signal will now be described with reference to FIG. 4. Referring to FIG. 4, a CDMA signal generator 100 generates transmission signals. The generated transmission signals are multiplied by a multiplier 120 by signals provided from an error calibration and compensation value calculator 180. Output signals of the multiplier 120 are added by an adder 140 to calibration signals provided from a calibration signal generator 110 via a switch 130, and then provided to an RF block 150. The RF block 150 converts the transmission signals into RF band signals, and transmits the converted RF band signals to antenna elements ANT0, ANT1, . . . , ANTn through a combiner 160. The combiner 160 feeds back part of combined signals of traffic signals and calibration signals to a switch 170. The feedback signals are applied to the error calibration and compensation value calculator 180 via the switch 170. The error calibration and compensation value calculator 180 calibrates errors of the feedback signals, calculates compensation values according to the calibrated errors, and provides the calculated compensation values to the multiplier 120. The multiplier 120 then multiplies the output signals of the CDMA signal generator 100 by the output signals of the error calibration and compensation value calculator 180. Through this process, an ideal beam pattern is formed by previously applying a predetermined distortion value illustrated in FIG. 3 to the phase-distorted signals illustrated in FIG. 2.

The PN code spreading method will be described with reference to FIG. 4. The PN code spreading method uses a PN code as a reference signal during transmission path calibration. That is, a reference signal generated by the calibration signal generator 110 becomes a PN signal. The reference signal is added to traffic signals by the adder 140, and the PN signal generated for the calibration functions as interference to the traffic signals, from the viewpoint of a terminal that receives the signal. That is, since the PN signal is not orthogonal with a Walsh code assigned to a traffic channel, the terminal cannot accurately extract only the calibration signal, resulting in a C/I (Carrier-to-Interference) loss.

For brief analysis, system environment will be simplified and then an influence of interference to a traffic signal for a calibration signal will be described. If it is assumed that a particular user firmly maintains orthogonality with other users in the cell, an interference signal includes only the reference signal used for calibration. When a signal, which is not orthogonal with a CDMA user and a control channel signal, is used as a reference signal, i.e., when the above-mentioned PN code spreading method is used, a carrier-to-interference ratio (CIR) is calculated as follows. If a data signal is defined as $$b(t) = \frac{1}{\sqrt{2}}(\pm 1 \pm j),$$

a Walsh code as w(t) and a PN code as c(t), then a traffic signal can be represented by $$Ab(t)w(t)c(t)\cos(2\pi f_c t) \quad \text{Equation (1)}$$

In Equation (1), A is a constant having a dummy value.

A calibration signal, for which a PN spreading code is used, can be represented by $A'c(t)\cos(2\pi f_c t)$, and a terminal receives a signal defined as $$Ab(t)w(t)c(t)\cos(2\pi f_c t)+A'c(t)\cos(2\pi f_c t)+n(t)\cos(2\pi f_c t) \quad \text{Equation (2)}$$

In Equation (2), A' indicates a level of a calibration signal, also having a dummy value, and n(t) indicates AWGN (Additive White Gaussian Noise). If c(t) is multiplied to despread Equation (2), then result becomes $$Ab(t)w(t)\cos(2\pi f_c t)+A'\cos(2\pi f_c t)+n(t)c(t)\cos(2\pi f_c t) \quad \text{Equation (3)}$$

Equation (3) uses PN code property given by $$c(t) \times c(t) = 1 \quad \text{Equation (4)}$$

As to conversion from Equation (2) into Equation (3), it is noted that formulas for traffic and calibration signals exclude c(t), and a noise is multiplied by c(t) to be spread. In addition, if a carrier frequency $f_c$ is multiplied in order to demodulate the signal of Equation (3), then the result becomes $$(Ab(t)w(t)\cos(2\pi f_c t)+A'\cos(2\pi f_c t)+n(t)c(t)\cos(2\pi f_c t))\cos(2\pi f_c t) \quad \text{Equation (5)}$$

Equation (5) can be rewritten using trigonometric relations, as follows.

$$(Ab(t)w(t) + A') \cdot \cos^2(2\pi f_c t) + n(t)c(t)\cos^2(2\pi_c t), \quad \text{Equation (6)}$$

$$= \frac{1}{2}(Ab(t)w(t) + A' + n(t)c(t)) \cdot (1 + \cos(2\pi 2 f_c t))$$

In order to extract a baseband signal from the signal of Equation (6), the signal must be filtered by a low pass filter. The signal of Equation (6), after being filtered by the low pass filter, becomes a signal from which a carrier frequency component $f_c$ is removed, and can be written as $$\frac{1}{2}(Ab(t)w(t) + A' + n(t)(ct)) \quad \text{Equation (7)}$$

n(t)(ct) must be changed to n(t)c(t) in below equation.

If Equation (7) is Walsh-demodulated using orthogonal property of a Walsh code, then it can be rewritten as $$\frac{1}{2}(Ab(t) + A'w(t) + n(t)w(t)c(t)) \quad \text{Equation (8)}$$

A description will now be made of CIR. If CIR is defined as Equation (9), CIR by the PN code spreading method can be represented by Equation (10).

$$CIR = \frac{I_C}{I_{OR} + N_t} \quad \text{Equation (9)}$$

$$CIR = \frac{A^2 \frac{1}{T_s}\int_{-\frac{T_s}{2}}^{\frac{T_s}{2}} b^2(t)dt}{A'^2 \frac{1}{T_s}\int_{-\frac{T_s}{2}}^{\frac{T_s}{2}} w^2(t)dt + N_t} = \frac{A^2}{A'^2 + N_t} \quad \text{Equation (10)}$$

In Equation (9), $I_C$ denotes power of a carrier received at a mobile terminal, $I_{OR}$ denotes an interference in the same cell, and $N_t$ denotes noise power. Therefore, if it is assumed that interference in the cell includes only a calibration signal and a noise component is negligible, then CIR can be approximated as follows $$\frac{I_C}{I_{OR} + N_t} = \frac{\frac{I_C}{I_{OR}}}{1 + \frac{N_t}{I_{OR}}} \cong \frac{I_C}{I_{OR}}, \quad \frac{N_t}{I_{OR}} \ll 1 \quad \text{Equation (11)}$$

It is noted from Equation (11) that a noise is multiplied by c(t) to be spread and its resultant level is reduced to a negligible value. Therefore, CIR is affected according to a level of calibration signal power. Therefore, when the PN code spreading method is used in the CDMA system, a C/I signal loss undesirably depends upon a power level of a PN signal, a calibration signal for calibrating phase distortion.

Second, the Walsh code spreading method will be described with reference to FIG. 4. The Walsh code spreading method performs calibration in the same way as the PN code spreading method, except that one of Walsh codes, is used as a calibration signal. That is, a Walsh code used in a CDMA system is used as the calibration signal output from the calibration signal generator 110. As a Walsh code used in the CDMA system is used as a calibration signal, orthogonality is provided between a calibration signal and a traffic signal. Thus, this method prevents the reference signal from functioning as interference to the traffic signal. However, the use of a Walsh code that can be used as a user code decreases the number of available Walsh codes, resulting in a reduction in system capacity. It is difficult to apply this method especially to a system requiring a high data rate, e.g., an EV-DO (Evolution Data Only) system, due to its limitation on available Walsh resources.

Third, the method of using an orthogonal code and DFT in a transmission path will be described. In this method, an m-sequence is used as a calibration signal. This method uses as many m-sequences as the number N of antenna elements, and provides a phase to each calibration signal by performing DFT on the m-sequences. Unlike in the other methods, an error between a calibration signal and a traffic signal is calibrated at a particular receiver separately prepared outside a terminal or a BTS. The receiver calibrates compensation information using autocorrelation property of the m-sequences and the DFT. That is, the receiver calibrates phase distortion by calibrating compensation information using the autocorrelation property of the m-sequences and the DFT, and then transmits the phase distortion value to a transmitter. In this method, since the receiver calculates an error and transmits the error to the transmitter, the receiver must include an addition device. That is, when the receiver is either separately provided outside the BTS or provided inside the BTS, a structure for calculating a phase distortion value using the autocorrelation property of the m-sequences and the DFT must be provided in addition to the structure of FIG. 4, causing an increase in the cost of the BTS.

Finally, the traffic signal feedback method will be described with reference to FIG. 4. This method feeds back a traffic signal rather than generating a reference signal and uses the feedback traffic signal as a reference signal, for transmission path calibration. Since no additional signal is used, this method does not have the defects that a reference signal functions as interference to a traffic signal. However, this method necessarily requires data storage for storing a traffic signal transmitted for comparison with a reference signal. That is, this method needs separate data storage for storing an output signal from the CDMA signal generator 100. In addition, the error calibration and compensation value calculator 180 synchronously reads the stored signal and an input signal, and determines phase distortion. In order to calculate phase distortion of each signal delivered to each antenna element, a switched power combiner must be used for a feedback traffic signal. That is, this method has a difficulty in simultaneously calibrating all antenna elements.

As described above, the PN code spreading method causes a C/I loss. The Walsh code spreading method reduces the number of available Walsh codes, causing a reduction in system capacity. Thus, the Walsh code spreading method can be hardly applied to the high-speed data transmission system such as the EV-DO system. The method of using an orthogonal code and DFT in a transmission path must include a separate device, causing an increase in system installation expense and an increase in the cost of a BTS. Finally, the traffic signal feedback method must further include a memory for storing signals transmitted to the BTS, and must synchronize the stored signals with input signals, increasing complexity of the circuit. In addition, this method cannot simultaneously calibrate phase distortion of all antenna elements.

SUMMARY OF THE INVENTION

It is, therefore, an object of the present invention to provide a transmission signal calibration apparatus and method for calibrating a phase of a transmission signal without affecting system capacity during calibration of an output signal in a CDMA system with a smart antenna.

It is another object of the present invention to provide a transmission signal calibration apparatus and method for correctly calibrating a signal output to a smart antenna without using an additional device, in a mobile communication system.

It is further another object of the present invention to provide an apparatus and method for easily calibrating phase distortion of an output signal to an antenna array of a smart antenna in a CDMA system.

It is still another object of the present invention to provide an apparatus and method for simultaneously calibrating phase and amplitude distortions of a signal output to an antenna array in a CDMA system.

To achieve the above and other objects, there is provided an apparatus for calibrating and compensating for distortion of an output signal to an antenna in a mobile communication system with a smart antenna array. A calibration signal generator generates an extended Walsh code by extending a Walsh code used in the mobile communication system, and generates a calibration signal in synchronism with a Walsh code synchronization signal of the mobile communication system. A mobile communication signal generator generates a traffic signal for forming a beam pattern to a position of a mobile terminal in communication. A multiplier multiplies an error compensation value by an output signal of the mobile communication signal generator. An adder adds an output of the multiplier to an output signal of the calibration signal generator. An RF block for up-converts an output signal of the adder into an RF band signal, provides the up-converted RF band signal to the antenna array, extracts part of the signal provided to the antenna array, and feeds back the extracted signal component. An error calibration and compensation value calculator calibrates an error of the antenna array from the feedback signal, calculates a compensation value for compensating for the error, and provides the compensation value to the multiplier.

To achieve the above and other objects, there is provided a method for calibrating and compensating for distortion of an output signal to an antenna in a mobile communication system with a smart antenna array. The method comprises generating an extended Walsh code by extending a Walsh code used in the mobile communication system, and generating a calibration signal in synchronism with a Walsh code synchronization signal of the mobile communication system; generating a traffic signal for forming a beam pattern to a position of a mobile terminal in communication; adding the calibration signal to the traffic signal; up-converting the added signal into a radio frequency (RF) band signal, providing the up-converted RF band signal to the antenna array, extracting part of signals provided to the antenna array, and feeding back the extracted signal component; calibrating an error of each antenna in the antenna array from the feedback signal, and calculating a compensation value for compensating for the error; and multiplying the calculated compensation value by the traffic signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
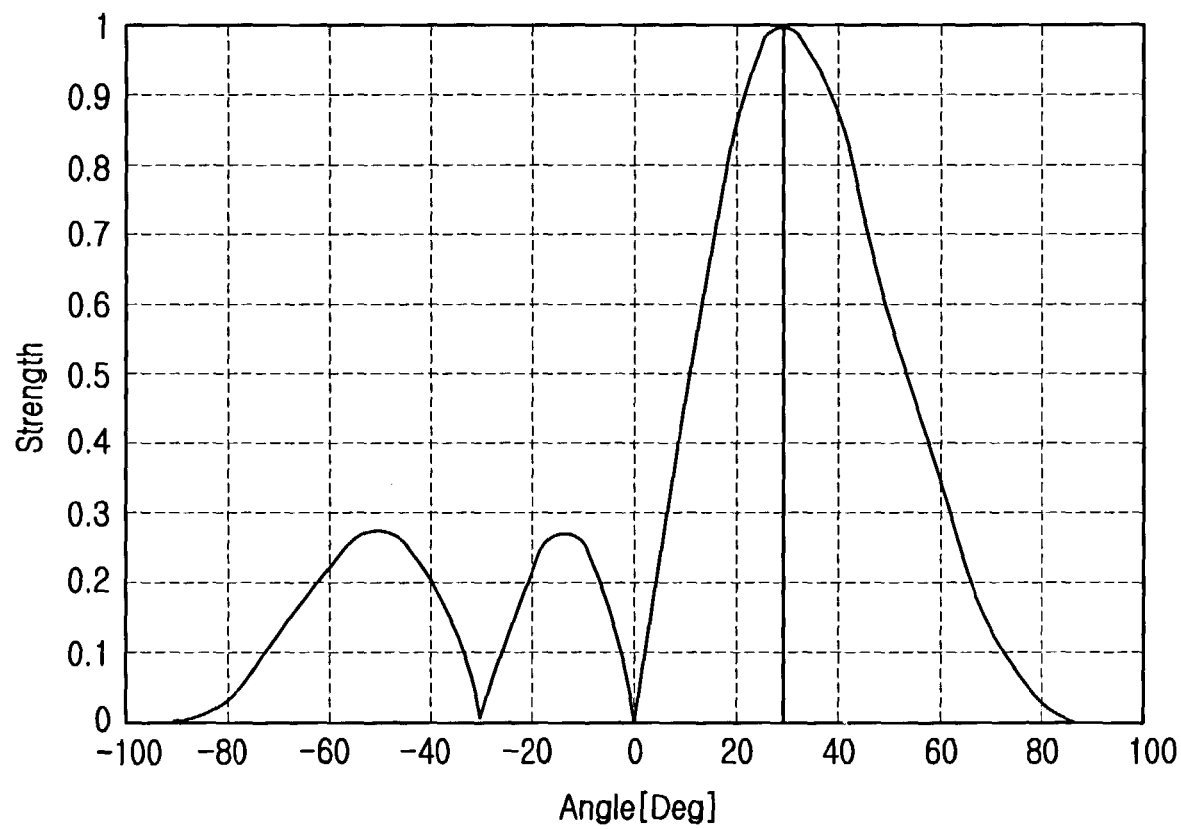
FIG. 1 is a graph illustrating an example of a normal beam pattern generated during transmission of a traffic signal to a mobile terminal in a mobile communication system with a smart antenna.

Embodiments of the present invention will now be described in detail with reference to the accompanying drawings. In the drawings, the same or similar elements are denoted by the same reference numerals. Also, a detailed description of known functions and configurations have been omitted for conciseness.

The present invention provides an apparatus and method for spreading a calibration signal with a Walsh code, a kind of orthogonal codes, so as to maintain orthogonality with a Walsh code used for a traffic signal, thereby minimizing interference by the calibration signal and securing optimal system performance. If Walsh codes available in the system are used for signal calibration, the number of Walsh codes available for user signals is decreased, causing a decrease in system capacity. Thus, the present invention extends Walsh codes and uses the extended Walsh codes for signal calibration. In addition, the present invention proposes a method for resolving a problem in a forward link where calibration signals are time-divided according to antennas before being transmitted. The proposed method can simultaneously transmit calibration signals for all antennas by using the orthogonal property of Walsh codes in accordance with a Hadamard transform, and extract reference signals for the respective antennas while minimizing interference.

Figure 5:
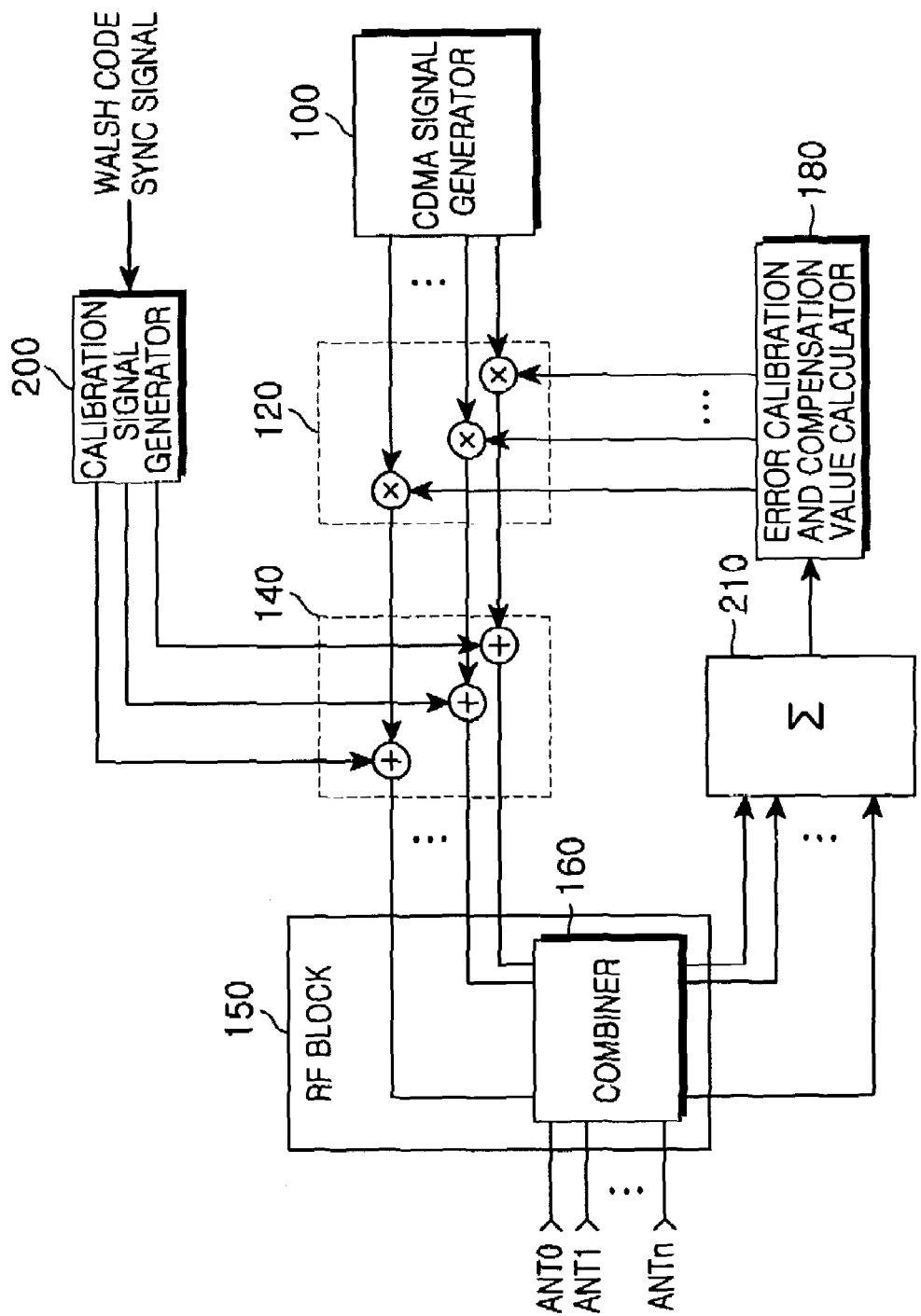
FIG. 5 is a block diagram illustrating an example of an apparatus for compensating for phase distortion of an output signal to a smart antenna array provided in a CDMA system according to an embodiment of the present invention.

A description will now be made of a block diagram of a base station transceiver subsystem (hereinafter referred to as "BTS") to which the present invention is applied. FIG. 5 is a block diagram illustrating an apparatus for compensating for phase distortion of an output signal for a smart antenna array provided in a code division multiple access (CDMA) system according to an embodiment of the present invention.

Referring to FIG. 5, a CDMA signal generator 100 generates transmission traffic signals, for which a beam forming process has been completed. Output signals of the CDMA signal generator 100 are multiplied by a multiplier 120 by output values of an error calibration and compensation value calculator 180, and then provided to an adder 140. The adder 140 adds output signals of a calibration signal generator 200 to output signals of the multiplier 120. The output signals of the calibration signal generator 200 are preferably Walsh code signals used in the system to which the present invention is applied. Therefore, the signals output from the calibration signal generator 200 must be synchronized with a Walsh code synchronization signal used in the system to which the present invention is applied.

Output signals of the calibration signal generator 200 will now be described. The invention uses a Walsh code as a calibration signal in order to minimize interference by the calibration signal. The Walsh code is orthogonal with a Walsh code used for traffic. If the Walsh code used for traffic transmission in the system is used as a calibration signal, the calibration signal does not provide interference due to orthogonality between the traffic signal and the calibration signal, and provides the optimum calibration method. However, if the Walsh codes used in the system are used for signal calibration, the Walsh resources used for traffic channels are wasted, reducing system capacity. Therefore, for signal calibration, the present invention uses extended Walsh codes, preventing a reduction in system capacity. A method of calculating the extended Walsh codes will now be described herein below.

A set of N Walsh codes having a length N is first defined as $$W^N = \begin{bmatrix} W^{\frac{N}{2}} & W^{\frac{N}{2}} \\ W^{\frac{N}{2}} & -W^{\frac{N}{2}} \end{bmatrix}, \quad W^2 = \begin{bmatrix} 1 & 1 \\ 1 & -1 \end{bmatrix} \quad \text{Equation (12)}$$

In the matrix of Equation (12), each row represents a Walsh code sequence $W_i^N$ having a length N and an index i (i=0,1, . . . ,N−1). It will be assumed herein that extended Walsh codes proposed by the present invention are applied to a CDMA2000 1× system. Although a length of Walsh codes used in the CDMA2000 1× system has a different value according to radio configuration (RC), it is set to a maximum of 128. Therefore, the extended Walsh codes are configured so that their length should have a value larger than 128. Although the number of Walsh codes having a length 128 is 128, the present invention extends in principle a first Walsh code having a fixed value in a code. In order to obtain Walsh codes having a length 512 after being extended, the Walsh code should be extended in the way given by Equation (13), as stated in the definition of the Walsh code set. Here, Equation (13) is given for the CDMA2000 1× system. Thus, Equation (13) can be normalized as shown by Equation (14).

$$w = W_0^{128}, \quad \text{Equation (13)}$$

$$W_{extended\ (length=256)} = \begin{bmatrix} w & w \\ w & -w \end{bmatrix},$$

$$W_{extended\ (length=512)} =$$

$$\begin{bmatrix} W_{extended\ (length=256)} & W_{extended\ (length=256)} \\ W_{extended\ (length=256)} & -W_{extended\ (length=256)} \end{bmatrix} =$$

$$\begin{bmatrix} w & w & w & w \\ w & -w & w & -w \\ w & w & -w & -w \\ w & -w & -w & w \end{bmatrix}$$

System using Walsh with length L, $w = W_0^L$, Equation (14)

-continued $$W_{extended(length=2L)} = \begin{bmatrix} w & w \\ w & -w \end{bmatrix},$$

$$W_{extended(length=4L)} =$$

$$\begin{bmatrix} W_{extended(length=2L)} & W_{extended(length=2L)} \\ W_{extended(length=2L)} & -W_{extended(length=2L)} \end{bmatrix} = \begin{bmatrix} w & w & w & w \\ w & -w & w & -w \\ w & w & -w & -w \\ w & -w & -w & w \end{bmatrix},$$

$$W_{extended(length=K)} =$$

$$\begin{bmatrix} W_{extended(length=K/2)} & W_{extended(length=K/2)} \\ W_{extended(length=K/2)} & -W_{extended(length=K/2)} \end{bmatrix}.$$

The extended Walsh codes having a length 512 illustrated in Equation (13) are assigned to one of the antenna elements, and is used as a reference signal for calibration. In the case of the extended Walsh code with a length 512, if the number of antenna elements is 4, sequences can be assigned to corresponding antennas. If the number of antenna elements is increased, the number of code sequences can be increased in the above-stated extension method. For example, if the number of antenna elements is increased to N, a length of an extended Walsh code is given by $$\text{Extended Walsh length} = n \cdot 2^{\lfloor \log 2N \rfloor} \quad \text{Equation (15)}$$

A description will now be made of a method for generating an extended Walsh code to be used in a CDMA 1× system using Walsh codes having a length 128. For example, if the number of antenna elements is 5, an extended Walsh length becomes $\lfloor \log_2 5 \rfloor = \lfloor 2.3219 \rfloor = 3$ in accordance with Equation (15). Therefore, in order to extend a Walsh code of length 128 and apply the extended Walsh codes to the 5 antenna elements, the Walsh code should be extended to 128×3=384.

In this manner, a calibration signal that maintains orthogonality with a traffic signal is generated. The calibration signals generated by the calibration signal generator 200 are provided to the adder 140. The adder 140 adds the output signals of the calibration signal generator 200 to the output signals of the multiplier 120, and provides output signals of adder 140 to an RF block 150. The RF block 150 then converts the provided signals into RF band signals, and transmits the converted RF band signals to antenna elements ANT0, ANT1, . . . , ANTn via a combiner 160. The combiner 160 extracts part of the signals input to the antenna elements ANT0, ANT1, . . . , ANTn, and provides the extracted signal components to an adder 210. The adder 210 sums the extracted signal components, and provides an input to the error calibration and compensation value calculator 180.

The extracted signal components are summed because even though calibration signals for the antennas are summed, phase and amplitude variation values of the antennas can be extracted by applying inverse Hadamard transform. A description will now be made of the inverse Hadamard transform.

For accurate beam forming in a forward link, calibration should be separately performed on the antennas. There is a method of separately performing calibration on the antennas by time-dividing a reference signal. However, this method has lower efficiency, compared with a method of simultaneously performing calibration on all antennas. In order to solve this problem, the present invention proposes a method of simultaneously transmitting as many Walsh codes in a set of extended Walsh codes as the number of antennas, through all antennas. That is, reference signals for the antennas are extracted using the orthogonal property of the Walsh codes.

For example, if the number of antenna elements is N and a length of a Walsh code is n, the method proposed by the invention extends the Walsh code to a Walsh code having a length defined by Equation (15), and simultaneously transmits the N extended Walsh codes through the antennas. A Walsh code transmitted through each antenna should be previously assigned. The N Walsh codes are fed back through a directional coupler, and summed by the adder 210. Herein, the combiner 160 serves as the directional coupler. In order to calibrate an error and calculate a compensation value according to antennas, it is necessary to extract a calibration signal previously assigned to each antenna, from the summed signal. If PN codes used in the system are used for calibration as sated in conjunction with the conventional method, distortion of a phase/amplitude-distorted calibration signal fed back to the error calibration and compensation value calculator 180 via the RF block 150 can be extracted using an autocorrelation property. However, the present invention uses inverse Hadamard transform in order to reduce calculations.

A set of Walsh codes having a length m is first defined as $$W^m = \begin{bmatrix} W_1 \\ \vdots \\ W_m \end{bmatrix} = \begin{bmatrix} w_{1,1} & \cdots & w_{1,m} \\ \vdots & \ddots & \vdots \\ w_{m,1} & \cdots & w_{m,m} \end{bmatrix}, \text{ for } N \leq m \quad \text{Equation (16)}$$

If a reference signal transmitted through an $N^{th}$ antenna element is defined as $r_N$, the $r_N$ becomes an extended Walsh code $W_N$ according to the present invention. A feedback signal V is a phase/amplitude-distorted signal for each antenna, and can be represented by $$V^m = \begin{bmatrix} V_1 \\ \vdots \\ V_m \end{bmatrix} = \begin{bmatrix} v_{1,1} & \cdots & v_{1,m} \\ \vdots & \ddots & \vdots \\ v_{m,1} & \cdots & v_{m,m} \end{bmatrix}; \quad \text{Equation (17)}$$

$$V_N = a_N W_N \exp(j\phi_N), (N = 1, \cdots, N \; N \leq m).$$

The feedback signals of Equation (17), received for the respective antennas, are summed by the adder 210, and represented by $$S = V_1 + V_2 + \cdots + V_{N-1} + V_N \quad \text{Equation (18)}$$

$$= a_1 W_1 \exp(j\phi_1) + a_2 W_2 \exp(j\phi_2) + \cdots +$$

$$a_{N-1} W_{N-1} \exp(j\phi_{N-1}) + a_N W_N \exp(j\phi_N)$$

If a signal obtained by extracting a signal for an $N^{th}$ antenna, summed in accordance with Equation (18), is $\hat{r}_N$, the extracted signal can be written as $$\hat{r}_N = S \cdot W_N^* \quad \text{Equation (19)}$$

$$= \{a_1 W_1 \exp(j\phi_1) + a_2 W_2 \exp(j\phi_2) + \cdots +$$

-continued $$a_{N-1}W_{N-1}\exp(j\phi_{N-1}) + a_N W_N \exp(j\phi_N)\} \cdot W_N^*$$

$$= a_1 W_1 W_N^* \exp(j\phi_1) + a_2 W_2 W_N^* \exp(j\phi_2) + \cdots +$$

$$a_{N-1}W_{N-1}W_N^* \exp(j\phi_{N-1}) + a_N W_N W_N^* \exp(j\phi_N)$$

$$= 0 + 0 + \cdots + 0 + a_N \exp(j\phi_N)$$

$$= a_N \exp(j\phi_N)$$

Therefore, it is possible to determine how much the phase and amplitude of a reference signal $r_N$ which is $W_N$. The present invention will now be described based on the assumption that a PN code is used as a calibration criterion and as many different PN codes as the number of antennas are generated to simultaneously calibrate all antennas.

For example, it is assumed that the number of antenna elements is N and PN codes are represented by $pn_1$, $pn_2$, ..., $pn_{N-1}$, $pn_N$. The PN codes can be generated either through different generator functions, or by applying different offsets (or delays) to one PN code. An autocorrelation function R is defined as $$R = \int_{-\infty}^{\infty} x(t)x(\tau - t)d\tau, \text{ (continuous signal } x(t))\quad \text{Equation (20)}$$

$$R = \sum_{\tau=-\infty}^{\infty} x(k)x(\tau - k), \text{ (discrete signal } x(k))$$

A signal determined by summing up the feedback signals from the combiner 160 by using the autocorrelation function R of Equation (20) can be represented by $$S(k) = a_1 pn_1(k)\exp(j\phi_1) + a_2 pn_2(k)\exp(j\phi_2) + \ldots + a_{N-1}pn_{N-1}(k)\exp(j\phi_{N-1}) + a_N pn_N(k)\exp(j\phi_N)\quad \text{Equation (21)}$$

If it is assumed that a length of a PN code used in Equation (21) is sampled by the chip level and the length is defined as L, then an $N^{th}$ antenna's signal extracted through the autocorrelation function is calculated by $$\hat{r} = \sum_{k=1}^{L} S(k) pn_N(k) \quad \text{Equation (22)}$$

$$= \sum_{k=1}^{L} a_1 pn_1(k)\exp(j\phi_1)pn_N(k) +$$

$$\sum_{k=1}^{L} a_2 pn_2(k)\exp(j\phi_2)pn_N(k) +$$

$$\vdots$$

$$\sum_{k=1}^{L} a_{N-1}pn_{N-1}(k)\exp(j\phi_1)pn_N(k) +$$

$$\sum_{k=1}^{L} a_N pn_N(k)\exp(j\phi_1)pn_N(k)$$

$$= \frac{-a_1\exp(j\phi_1)}{L} + \frac{-a_2\exp(j\phi_2)}{L} + \cdots +$$

$$\frac{-a_{N-1}\exp(j\phi_{N-1})}{L} + a_N\exp(j\phi_N)L$$

where, $$\sum_{k=1}^{L} pn_n(k)pn_n(k) = L$$

$$\sum_{k=1}^{L} pn_n(k)pn_m(k) = -\frac{1}{L}, \quad pn_{n \text{ or } m}(k) = \pm 1, \forall k$$

In Equation (22), in order to accurately extract amplitude distortion for an $N_{th}$ antenna, the value L should be large enough so that amplitude distortion values for the other antennas can be neglected. In addition, it is not possible to extract accurate phase distortion with only Equation (22), since phase components for all antennas remain. Therefore, even though the method of simultaneously transmitting as many PN codes as the number of antennas is used, it is not possible to simultaneously calibrate several antennas. In other words, the method of simultaneously calibrating several antennas by simultaneously transmitting PN codes results in poor performance. Therefore, in order to simultaneously calibrate several antennas by using PN codes, it is preferable to use a method of applying an offset to PN codes used for the antennas, or a method of calibrating the antennas one by one.

The present invention contributes to an increase in a CIR value, and this will be described below. When a calibration signal is spread with an extended Walsh code proposed by the present invention, a CIR value depends upon orthogonality between $I_C$ and $I_{OR}$. A description will now be made of a method for calculating a CIR value according to the present invention on the assumption that an extended Walsh code is w'(t). A signal model where a terminal receives a signal transmitted from a BTS in a CDMA mobile communication system can be represented by $$Ab(t)w(t)c(t)\cos(2\pi f_c t) + A'w'(t)c(t)\cos(2\pi f_c t) + n(t)\cos(2\pi f_c t) \quad \text{Equation (23)}$$

If the received signal of Equation (23) is multiplied by c(t) for despreading, it can be rewritten as $$Ab(t)w(t)\cos(2\pi f_c t) + A'w'(t)\cos(2\pi f_c t) + n(t)c(t)\cos(2\pi f_c t) \quad \text{Equation (24)}$$

A process of decoding the despread signal of Equation (24) can be sequentially written, as follows.

$$(Ab(t)w(t)\cos(2\pi f_c t) + A'w'(t)\cos(2\pi f_c t) + \quad \text{Equation (25)}$$
$$n(t)c(t)\cos(2\pi f_c t)) \cdot \cos(2\pi f_c t)$$

$$Ab(t)w(t)\cos^2(2\pi f_c t) + A'w'(t)\cos^2(2\pi f_c t) +$$
$$n(t)c(t)\cos^2(2\pi f_c t)$$

$$\frac{1}{2}(Ab(t)w(t) + A'w'(t) + n(t)c(t)) \cdot (1 + \cos(2\pi 2 f_c t))$$

The decoding process of Equation (25) represents an operation of eliminating all carrier frequencies and then performing signal processing on baseband signals. The baseband signals generated through the above process can be represented by $$\frac{1}{2}(Ab(t)w(t) + A'w'(t) + n(t)c(t)) \quad \text{Equation (26)}$$

-continued $$\frac{1}{2}(Ab(t) + A'w'(t)w(t) + n(t)w(t)c(t))$$

In the ideal case of Equation (26), the product of w'(t) and w(t) must be 0 (w'(t)·w(t)=0). Actually, however, orthogonality between two Walsh codes cannot be completely secured due to mismatching of a filter. Therefore, from Equation (26), a CIR value according to the present invention can be represented by $$CIR = \frac{A^2 \frac{1}{T_s} \int_{-\frac{T_s}{2}}^{\frac{T_s}{2}} b^2(t) dt}{A'^2 \frac{1}{T_s} \int_{-\frac{T_s}{2}}^{\frac{T_s}{2}} w(t)w'(\tau-t)dt + N_t}$$

$$= \frac{A^2}{A'^2 R_{ww'} + N_t},$$

Equation (27)

When interference in the cell exists in only a calibration signal and a noise component is negligible as described in conjunction with the prior art, Equation (27) can be approximated as follows $$\frac{I_C}{I_{OR} R_{w',w} + N_t} = \frac{\frac{I_C}{I_{OR}}}{R_{w',w} + \frac{N_t}{I_{OR}}} \cong \frac{\frac{I_C}{I_{OR}}}{R_{w',w}},$$

Equation (28)

$$\frac{N_t}{I_{OR}} \ll R_{w',w}$$

It can be understood from the approximated value of Equation (28) that CIR is in proportion to cross correlation between two Walsh codes. The cross correlation serves as inter-symbol interference (ISI). When the present invention is applied to CIR (Ic/Ior) to which the present invention is not applied, a relative gain obtained is calculated by gain=10 log$_{10}$(R$_{w',w}$)  Equation (29)

A description will now be made of calibration of cross correlation. ISI generated due to cross correlation between Walsh codes will always be 0 (zero), when ideal transmission and reception filters are used. However, in some cases, the transmission filter is not completely matched to the reception filer. For example, in the filter specification of IS-2000 standard, a 48-tap filter coefficient is used and a sampling signal of a chip ×4 level is filtered. If an input signal is defined as p(n), a filter coefficient as g(m) (where −24≦m≦23), and a filter output as r(n), then the filter output can be represented by r(n)=p(n)g(−24)+p(n-1)g(−23)+ . . . +p(n-46)g(22)+p(n-47)g(23)  Equation (30)

Therefore, ISI can be calculated by $$ISI = \frac{g^2(0)}{\sum_{k=-6, k \neq 0}^{6} g^2(4k)}$$

Equation (31)

If ISI is calculated using a filter coefficient specified by IS-2000 standard in accordance with Equation (31), then the ISI becomes at or about $10^{-1.63233}$. As a result, when an extended Walsh code proposed by the present invention is used, it is possible to obtain a relative gain of about 16.3222 dB.

A description will now be made of how the error calibration and compensation value calculator 180 calibrates phase variation and performs error compensation. A reference signal is fed back by the combiner 160 arranged in the previous stage of the antenna array, and then subjected to error calibration and compensation. A signal used in performing error calibration and compensation is a sampling signal of a chip ×n level, amplitude and phase of which were distorted according to the performance of an RF device and hardware of the system. If it is assumed that a phase error is featured by having normal distribution, it is preferable to compensate for phase and amplitude by accumulating a feedback signal for a predetermined time period rather than calibrating the phase and amplitude every chip ×n level. If a reference signal, whose phase and amplitude information is known, is defined as 'r' and a feedback signal having an error is defined as $\hat{r}_N$, then the reference signal and the feedback signal can be represented by $r=a_0 e^{j\Theta_0}$, $\hat{r}=a_1 e^{j\Theta_1}=a_1 e^{j(\Theta_0+\Delta\Theta)}$  Equation (32)

Therefore, an error for amplitude becomes a0-a1, and an error for a phase becomes $\Delta\Theta$. Since information on the reference signal r is previously known, an error for amplitude and phase can be simply calibrated. The calibrated error is added to or subtracted from a traffic signal to form accurate transmission and reception beams.

Figure 2:
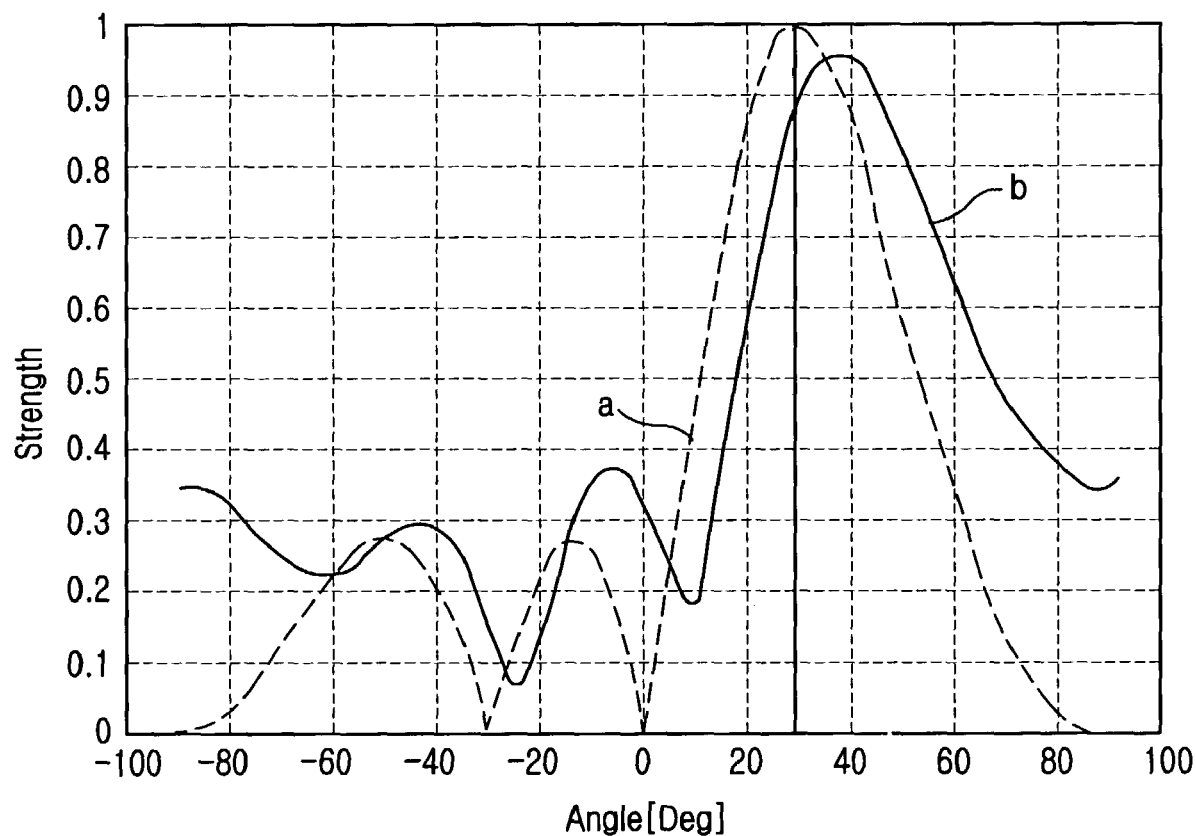
FIG. 2 is a graph illustrating an example of a normal beam pattern generated during transmission of a traffic signal to a mobile terminal and an actual beam pattern due to a phase and amplitude error in a mobile communication system with a smart antenna.
Figure 3:
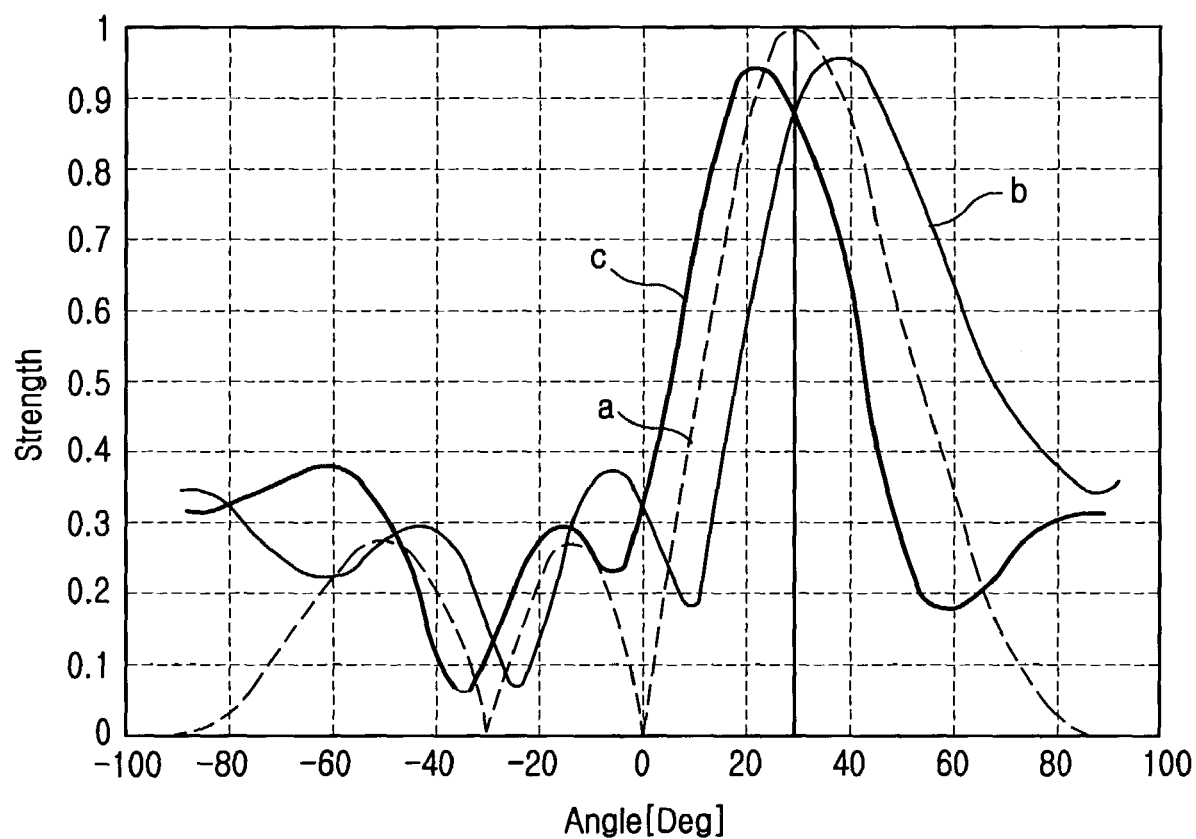
FIG. 3 is a graph illustrating an example of a normal beam pattern generated during transmission of a traffic signal to a mobile terminal, an actual beam pattern due to a phase error, and a compensation signal in a mobile communication system with a smart antenna.
Figure 4:
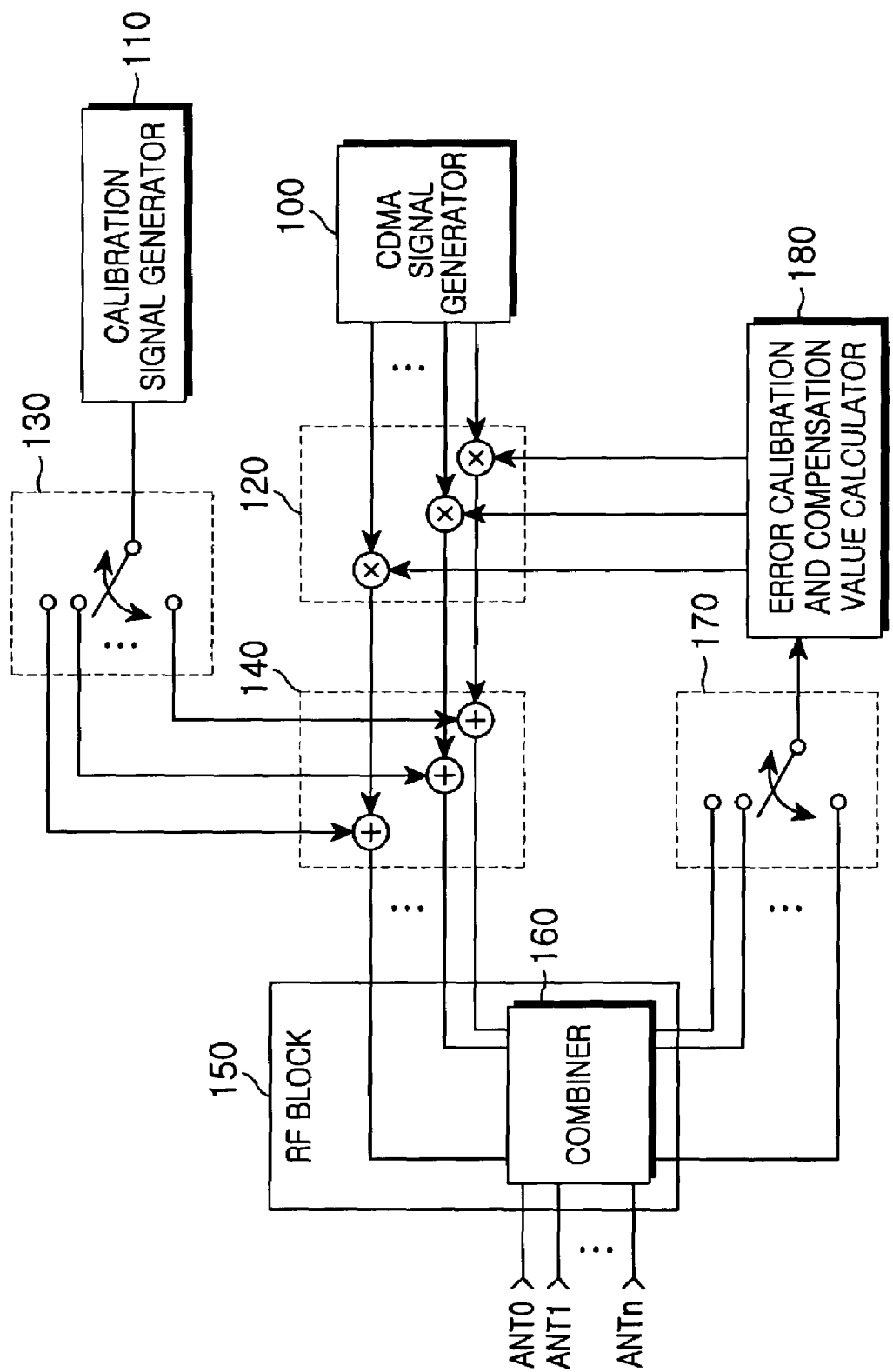
FIG. 4 is a block diagram illustrating an example of an apparatus for calibrating and compensating an output signal to a smart antenna array according to the prior art.

A description will now be made of actual phase calibration and compensation. It is assumed that a user is located in the direction of +30° in front of a BTS, the number of antennas is 4, phase errors for the respective antennas due to RF device and hardware are +30°, +8°, +45° and +88°, and there is no amplitude error. Then, a beam must be formed as illustrated in FIG. 1, to a user located in the direction of +30° in front of the BTS through a smart antenna system. However, due to the phase error, a beam pattern is generated as illustrated in FIG. 2. Therefore, an actual beam is formed as illustrated in FIG. 1 by calibrating an error generated as illustrated in FIG. 2 and forming a beam illustrated in FIG. 3 to thereby reflect a system error.

As described above, the CDMA system with a smart antenna generates a calibration signal using an extended Walsh code generated from a Walsh code for transmission of traffic data, and performs signal calibration depending upon the calibration signal. As a result, the system can minimize interference to its traffic signal during signal calibration. In addition, the structure proposed by the present invention can contribute to a reduction in system complexity and perform simultaneous calibration on the antenna elements.

While the invention has been shown and described with reference to a certain embodiment thereof, it will be understood by those skilled in the art that various changes in form and details may be made therein without departing from the spirit and scope of the invention as defined by the appended claims.

What is claimed is:

1. An apparatus for calibrating and compensating for distortion of an output signal to an antenna in a mobile communication system with a smart antenna array, the apparatus comprising:

a calibration signal generator for generating an extended Walsh code by extending a Walsh code used in the mobile communication system, and for generating a calibration signal using the extended Walsh code, wherein the extended Walsh code is configured as a first Walsh code having a fixed value in a code and the calibration signal is in synchronism with a Walsh code synchronization signal of the mobile communication system;

a mobile communication signal generator for generating a traffic signal for forming a beam pattern to a position of a mobile terminal in communication;

a multiplier for multiplying an error compensation value by an output signal of the mobile communication signal generator;

an adder for adding an output signal of the calibration signal generator to an output of the multiplier; a radio frequency (RF) block for up-converting an output signal of the adder into an RF band signal, providing the up-converted RF band signal to the antenna array, extracting part of the signal provided to the antenna array, and feeding back the extracted signal component; and an error calibration and compensation value calculator for calibrating an error of the antenna array from the feedback signal, calculating a compensation value for compensating for the error, and providing the compensation value to the multiplier, wherein the calibration signal generator generates a calibration signal by calculating an extended Walsh length in accordance with the following equation:

Extended Walsh length=$n \cdot 2^{\lceil \log_2 N \rceil}$ where n denotes a Walsh length used in the system and N denotes the number of antennas in the antenna array.

2. The apparatus of claim 1, wherein the RF block includes a combiner for extracting part of signals provided to the antenna array and feeding back the extracted signal component.

3. The apparatus of claim 2, wherein the combiner is a directional coupler.

4. The apparatus of claim 1, further comprising an adder for summing up signals fed back from the RF block and providing the resultant signal to the error calibration and compensation value calculator.

5. The apparatus of claim 1, wherein the error calibration and compensation value calculator performs phase and amplitude compensation by accumulating the feedback signal for a predetermined time period.

6. The apparatus of claim 1, wherein the error calibration and compensation value calculator extracts a reference signal of each antenna in the antenna array by inverse Hadamard transform.

7. An apparatus for calibrating and compensating for distortion of an output signal to an antenna in a mobile communication system with a smart antenna array, the apparatus comprising:

a calibration signal generator for generating an extended Walsh code by extending a Walsh code used in the mobile communication system, and for generating a calibration signal using the extended Walsh code, wherein the extended Walsh code is configured as a first Walsh code having a fixed value in a code and the calibration signal is in synchronism with a Walsh code synchronization signal of the mobile communication system;

a mobile communication signal generator for generating a traffic signal for forming a beam pattern to a position of a mobile terminal in communication;

a multiplier for multiplying an error compensation value by an output signal of the mobile communication signal generator;

an adder for adding an output signal of the calibration signal generator to an output of the multiplier; a radio frequency (RF) block for up-converting an output signal of the adder into an RF band signal, providing the up-converted RF band signal to the antenna array, extracting part of the signal provided to the antenna array, and feeding back the extracted signal component; and an error calibration and compensation value calculator for calibrating an error of the antenna array from the feedback signal, calculating a compensation value for compensating for the error, and providing the compensation value to the multiplier, wherein the extended Walsh code from the calibration signal generator is generated using a value calculated by the following equation:

System using Walsh with length $L$, $w = W_0^L$, $$W_{extended(length=2L)} = \begin{bmatrix} w & w \\ w & -w \end{bmatrix},$$

$$W_{extended(length=4L)} = \begin{bmatrix} W_{extended(length=2L)} & W_{extended(length=2L)} \\ W_{extended(length=2L)} & -W_{extended(length=2L)} \end{bmatrix}$$

$$= \begin{bmatrix} w & w & w & w \\ w & -w & w & -w \\ w & w & -w & -w \\ w & -w & -w & w \end{bmatrix},$$

$$W_{extended(length=K)} = \begin{bmatrix} W_{extended(length=K/2)} & W_{extended(length=K/2)} \\ W_{extended(length=K/2)} & -W_{extended(length=K/2)} \end{bmatrix}.$$

8. A method for calibrating and compensating for distortion of an output signal to an antenna in a mobile communication system with a smart antenna array, the method comprising the steps of:

generating an extended Walsh code by extending a Walsh code used in the mobile communication system, and for generating a calibration signal using the extended Walsh code, wherein the extended Walsh code is configured as a first Walsh code having a fixed value in a code and the calibration signal is in synchronism with a Walsh code synchronization signal of the mobile communication system;

generating a traffic signal for forming a beam pattern to a position of a mobile terminal in communication;

adding the calibration signal to the traffic signal;

up-converting the added signal into a radio frequency (RF) band signal, providing the up-converted RF band signal to the antenna array, extracting part of signals provided to the antenna array, and feeding back the extracted signal component;

calibrating an error of each antenna in the antenna array from the feedback signal, and calculating a compensation value for compensating for the error; and multiplying the calculated compensation value by the traffic signal, wherein the calibration signal generator generates a calibration signal by calculating an extended Walsh length in accordance with the following equation:

Extended Walsh length=$n \cdot 2^{\lceil \log_2 N \rceil}$ where n denotes a Walsh length used in the system and N denotes the number of antennas in the antenna array.

9. A method for calibrating and compensating for distortion of an output signal to an antenna in a mobile communication system with a smart antenna array, the method comprising the steps of:

generating an extended Walsh code by extending a Walsh code used in the mobile communication system, and for generating a calibration signal using the extended Walsh code, wherein the extended Walsh code is configured as a first Walsh code having a fixed value in a code and the calibration signal is in synchronism with a Walsh code synchronization signal of the mobile communication system;

generating a traffic signal for forming a beam pattern to a position of a mobile terminal in communication;

adding the calibration signal to the traffic signal;

up-converting the added signal into a radio frequency (RF) band signal, providing the up-converted RF band signal to the antenna array, extracting part of signals provided to the antenna array, and feeding back the extracted signal component;

calibrating an error of each antenna in the antenna array from the feedback signal, and calculating a compensation value for compensating for the error; and multiplying the calculated compensation value by the traffic signal, wherein the extended Walsh code from the calibration signal generator is generated using a value calculated by the following equation:

System using Walsh with length $L$, $w = W_0^L$, $$W_{extended(length=2L)} = \begin{bmatrix} w & w \\ w & -w \end{bmatrix},$$

$$W_{extended(length=4L)} = \begin{bmatrix} W_{extended(length=2L)} & W_{extended(length=2L)} \\ W_{extended(length=2L)} & -W_{extended(length=2L)} \end{bmatrix}$$

$$= \begin{bmatrix} w & w & w & w \\ w & -w & w & -w \\ w & w & -w & -w \\ w & -w & -w & w \end{bmatrix},$$

$$W_{extended(length=K)} = \begin{bmatrix} W_{extended(length=K/2)} & W_{extended(length=K/2)} \\ W_{extended(length=K/2)} & -W_{extended(length=K/2)} \end{bmatrix}.$$

* * * * *